United States Patent
Smith

(10) Patent No.: US 6,919,821 B1
(45) Date of Patent: Jul. 19, 2005

(54) METHOD AND SYSTEM FOR COLLECTING METEOROLOGICAL DATA USING IN-VEHICLE SYSTEMS

(75) Inventor: Nicholas E. Smith, Oak Park, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 09/573,692

(22) Filed: May 19, 2000

(51) Int. Cl.[7] .............................................. G08G 1/09
(52) U.S. Cl. ..................... 340/905; 340/601; 340/602; 340/901; 340/904
(58) Field of Search ........................ 340/905, 901, 340/904, 988, 989, 995.1, 602, 584, 995, 601

(56) References Cited

U.S. PATENT DOCUMENTS

| | | | |
|---|---|---|---|
| 4,907,159 A | | 3/1990 | Mauge et al. |
| 5,699,056 A | * | 12/1997 | Yoshida ....................... 340/905 |
| 5,710,565 A | | 1/1998 | Shirai et al. |
| 6,154,699 A | * | 11/2000 | Williams ....................... 701/50 |
| 6,275,231 B1 | * | 8/2001 | Obradovich ................. 345/349 |
| 6,292,747 B1 | * | 9/2001 | Amro et al. ................. 701/213 |
| 6,359,571 B1 | * | 3/2002 | Endo et al. .................. 340/988 |
| 6,535,141 B1 | * | 3/2003 | Doherty ....................... 340/905 |

* cited by examiner

*Primary Examiner*—Julie Bichngoc Lieu
(74) *Attorney, Agent, or Firm*—Jon D. Shutter; Frank J. Kozak; Lawrence M. Kaplan

(57) ABSTRACT

A method and system for collecting meteorological data. A plurality of vehicles travel on roads in a geographic region. Each of the vehicles includes sensor equipment that senses at least one meteorological condition. The sensor equipment may be used to support other vehicle systems, such as vehicle safety systems or a vehicle navigation system. Each of the vehicles includes a program run on a computing device in the vehicle that prepares messages containing data indicative of the one or more meteorological conditions sensed by the sensor equipment. The messages are sent wirelessly from the vehicle to a meteorological data collection service that collects the data and uses the data for weather modeling or forecasting.

27 Claims, 3 Drawing Sheets

METHOD AND SYSTEM FOR COLLECTING METEOROLOGICAL DATA USING IN-VEHICLE SYSTEMS

BACKGROUND OF THE INVENTION

The present invention relates to a method and system for collecting meteorological data using in-vehicle systems.

Weather forecasting is an important function that affects many facets of human activity. For example, weather forecasting may be used by transportation businesses, delivery businesses, sports stadiums, construction companies, agriculture, etc.

Weather forecasting relies on models that are developed using data collected at various weather stations located throughout a region. Improvements in the quality and quantity of climate-related data collection may improve the weather models with resultant improvements in weather forecasting.

Existing weather stations provide for collection of a relatively large amount of meteorological data. However, collection of more data may provide even better weather modeling.

Accordingly, it is an object of the present invention to provide for improved collection of meteorological data.

SUMMARY OF THE INVENTION

To address these and other objectives, the present invention comprises a method and system for collecting meteorological data. A plurality of vehicles travel on roads in a geographic region. Each of the vehicles includes sensor equipment that senses at least one meteorological condition. The sensor equipment may be used to support other vehicle systems, such as vehicle safety systems or a vehicle navigation system. Each of the vehicles includes a program run on a computing device in the vehicle that prepares messages containing data indicative of the one or more meteorological conditions sensed by the sensor equipment. The messages are sent wirelessly from the vehicle to a meteorological data collection service that collects the data and uses the data for weather modeling or forecasting.

DETAILED DESCRIPTION OF THE PRESENTLY PREFERRED EMBODIMENTS

Figure 1:
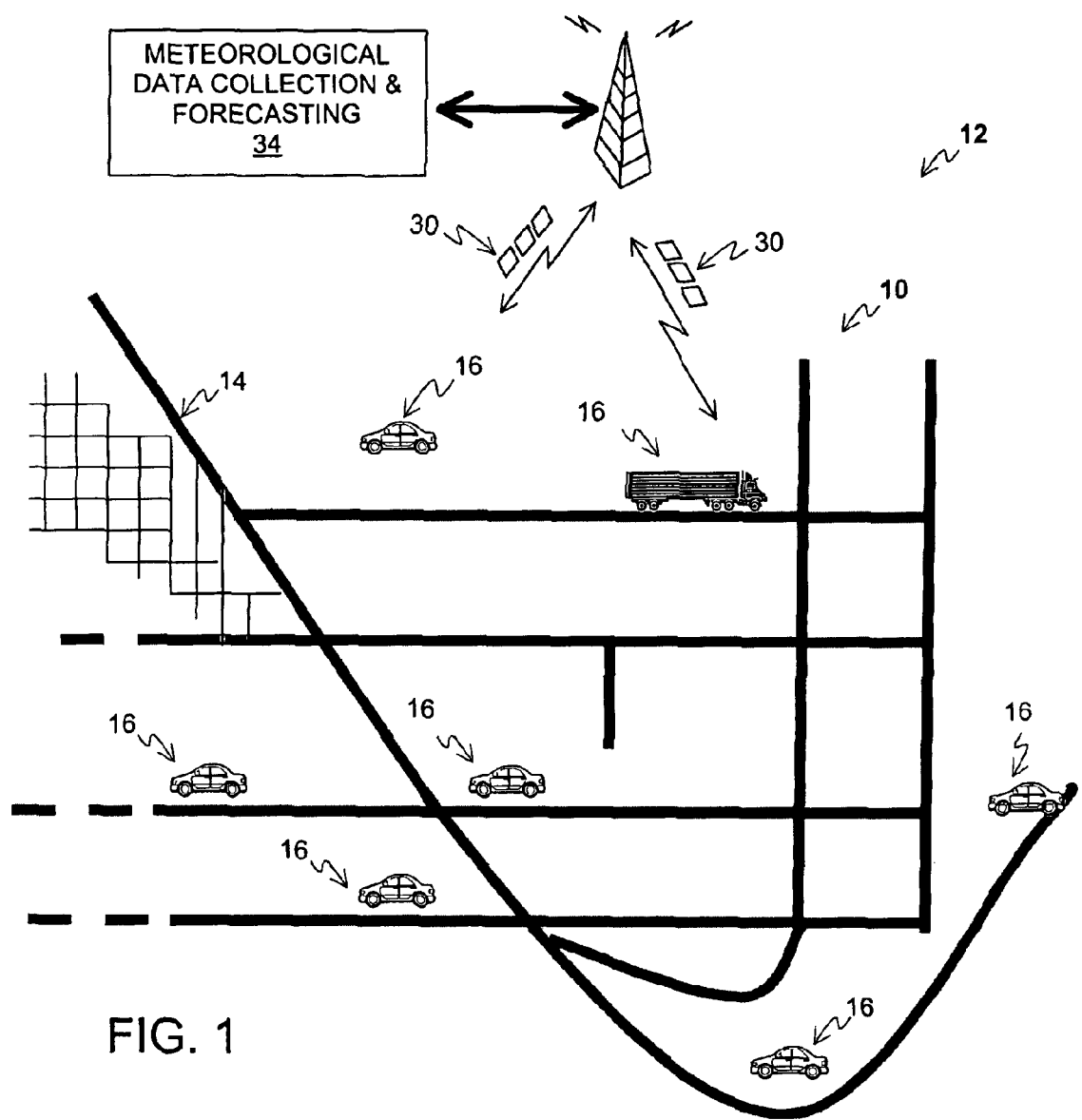
FIG. 1 is an illustration of a road network in a geographic region and a plurality of vehicles located on the road network.

Referring to FIG. 1, there is an illustration of a portion 10 of a geographic area 12. Located in the geographic area 12 is a road network 14. A plurality of vehicles 16 are traveling along the roads of the road network 14. Each of the plurality of vehicles 16 is equipped with sensor equipment that includes equipment that can detect meteorological conditions.

Figure 2:
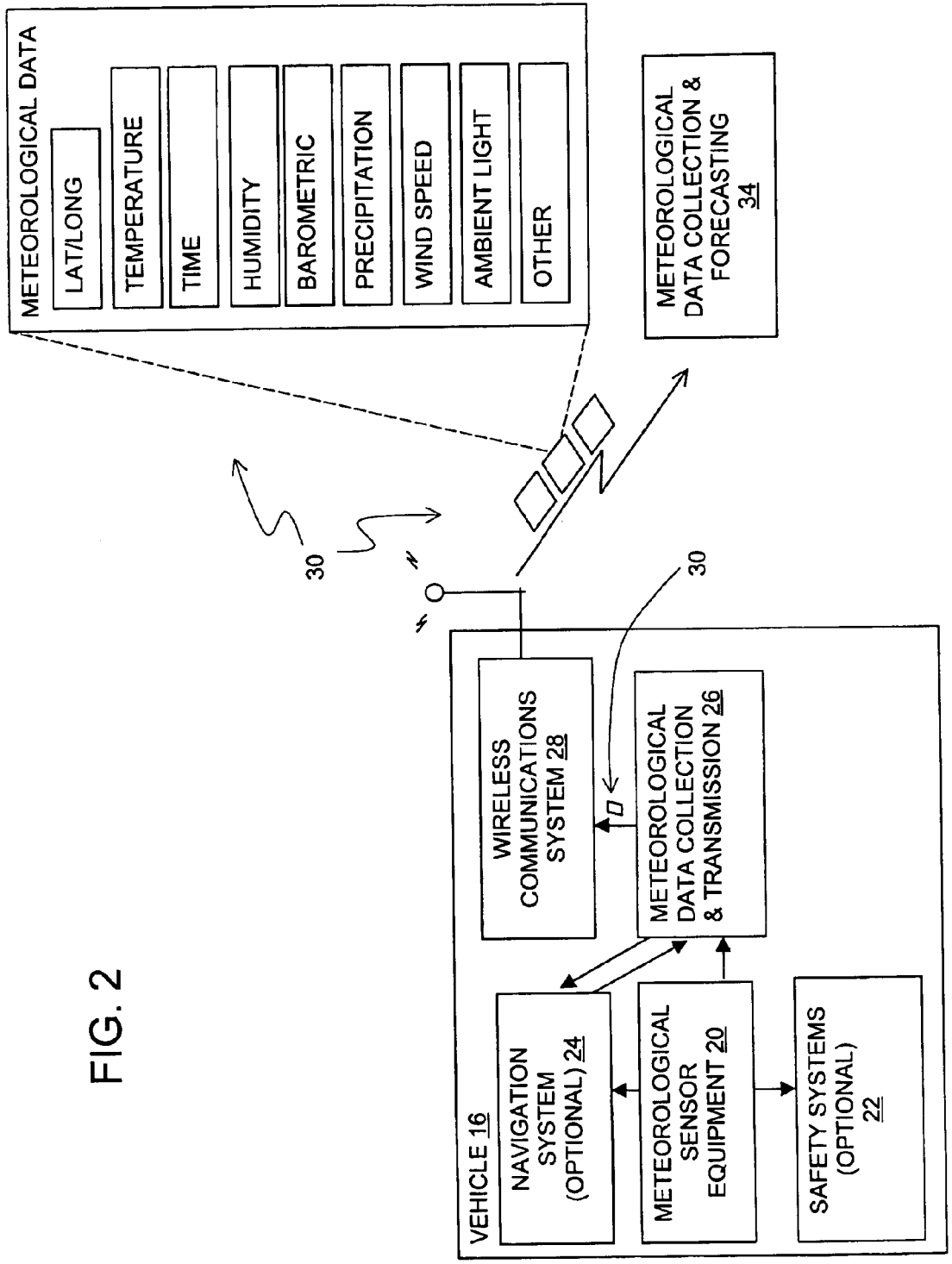
FIG. 2 is an illustration of one of the vehicles shown in FIG. 1.

FIG. 2 is a diagram that shows some of the components of one of the vehicles 16 of FIG. 1. The vehicle 16 shown in FIG. 2 is representative of each of the plurality of vehicles 16 in FIG. 1, i.e., each of the vehicles 16 in FIG. 1 is similarly equipped as the vehicle 16 shown in FIG. 2. As shown in FIG. 2, the vehicle 16 includes sensor equipment 20. For example, the sensor equipment 20 may include a thermometer, a hydrometer, radar, and sensors that measure wind speed, ice conditions on the road, precipitation, light conditions, as well as other equipment. The sensor equipment 30 also includes positioning system components that can determine the instantaneous vehicle position. The positioning system components may include a GPS receiver, dead-reckoning equipment, or a combination of GPS and dead-reckoning equipment. The sensor equipment 20 may also include a clock that can determine the time.

The sensor equipment 20 may be part of, or be associated with, vehicle safety systems 22 and a vehicle navigation system 24. The vehicle safety systems 22 and the vehicle navigation system 24 are optional and some or all the vehicles 16 may not include either the vehicle safety systems 22 or the navigation system 24. The safety systems 22 may include adaptive cruise control, curve detection and warning, obstacle avoidance, and lane departure warning, as well as other systems that use or rely on the sensor equipment 20. The navigation system 24 uses data from the sensor equipment 20, such as the positioning system components, in combination with geographic data to provide navigation-related features, such as route calculation, route guidance, and map display.

The vehicle 16 also includes a meteorological data collection and transmission program 26. The meteorological data collection and transmission program 26 is implemented on a computing unit in the vehicle 16. The computing unit may be one of the computing units in the safety systems 22 or may be the same computing unit used in the navigation system 24 or may be another computing device. The computing unit may be a CUP, an ECU, or any other type of programmable computing device. The data collection and transmission program 26 collects meteorological data from the sensor equipment 20. The data collection and transmission program 26 organizes the meteorological data into messages 30. Each message 30 includes meteorological data. The meteorological data in each message may include the temperature, the humidity, precipitation, wind speed, ambient light, as well as other data. The meteorological data included in each message are obtained from the sensor equipment 20. The meteorological data in each message may represent the instantaneous sensor readings at the time the message was prepared (or sent) by the meteorological data collection and transmission program 26. Alternatively, the meteorological data in each message may represent the sensor readings at a prior specific time, e.g., prior to when the message was prepared. Each message 30 also includes data indicating a location. The location data can indicate the instantaneous vehicle location when the message was prepared (or sent), as determined by the positioning system components in the sensor equipment 20. Alternatively, the location data may indicate the vehicle location at a previous time when the meteorological data in the message were collected. Each message 30 also includes data indicating the time of the message. The time data of the message may be the instantaneous time when the message was prepared (or sent) or alternatively, the time data may indicate an earlier time when the meteorological data included in the message were collected.

The meteorological data collection and transmission program 26 uses a wireless communications system 28 of the vehicle 16 to send the message 30 containing the meteorological data as the vehicle 16 is traveling along the road network 14. The wireless communications systems 28 may use any suitable technology, such as cellular communication. The wireless communications system 28 may use any suitable protocol for the transmission of the messages, such as WAP, TCP/IP, the protocol described in U.S. Pat. No. 5,808,566 (the entire disclosure of which is incorporated by reference herein), or a combination of these or other wireless data transmission protocols that currently exist or that are developed in the future. The messages 30 sent from the vehicle may be compressed, if appropriate.

The meteorological data collection and transmission program 26 sends a series of messages 30 as the vehicle 16 is traveling along the road network 14. Each message 30 includes data representing meteorological conditions at a new vehicle position, a new time, or both a new vehicle position and time. For example, the meteorological data collection and transmission program 26 may send a new message 30 every 5 seconds, every 30 seconds, every minute, and so on. Alternatively, the meteorological data collection and transmission program 26 may send a new message 30 based upon distance traveled, e.g., every 30 meters, every 100 meters, etc. Alternatively, a combination of time and distance may be used.

Referring to FIGS. 1 and 2, the messages 30 from each of the vehicles 16 are received by a meteorological data collection and forecasting service 34. The meteorological data collection and forecasting service 34 collects the meteorological data from all the vehicles 16 traveling along the road network 14 in the geographic region 12. The meteorological data collection and forecasting service 34 uses the collected meteorological data from forming weather models, for weather forecasting, or for other weather-related purposes.

Figure 3:
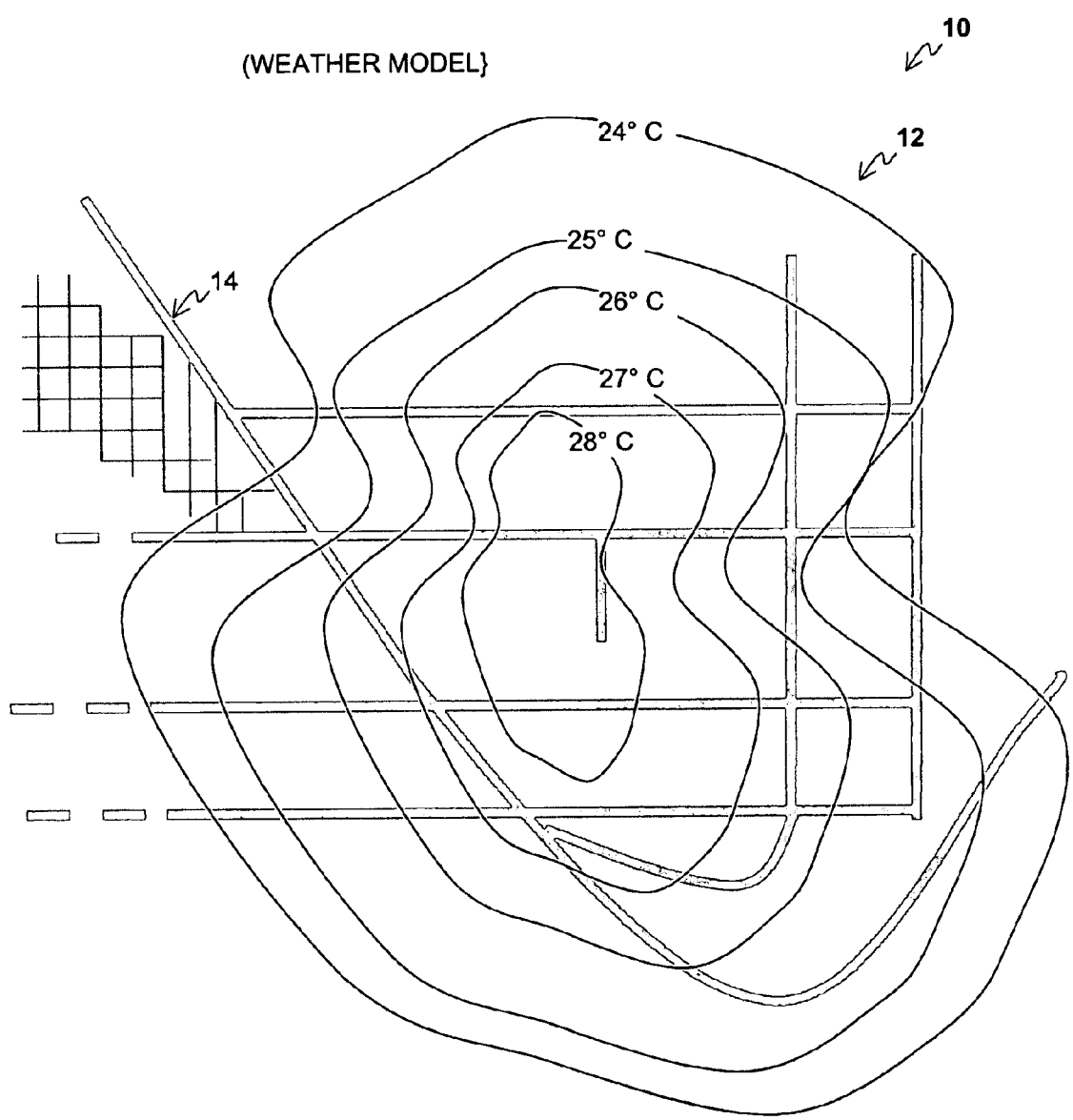
FIG. 3 is a map illustrating the plotting of isotherms using the meteorological data collected with the system of FIG. 1.

FIG. 3 shows isotherms for the portion 10 of the geographic region 12 shown in FIG. 1. The isotherms were developed using meteorological data collected by the sensor systems in the vehicles. Although FIG. 3 shows only temperature data, similar weather models can be developed for other collected meteorological data.

After the data collected by the meteorological data collection and forecasting service 34 are processed, weather-related information can be sent back to the vehicles and used by the vehicles. For example, data concerning precipitation collected by some vehicles in one area may be used to warn other vehicles traveling toward the area about wet driving conditions ahead. Further, weather data, such as forecasts for areas not covered by sensor-equipped vehicles, can be relayed back to vehicles that participate in data collection.

In accordance with a further aspect, drivers are provided with the incentive to use their vehicles to collect meteorological data for a weather service by being provided with weather-related information for free. The weather-related information to which participating drivers would be entitled would not be limited to only the areas for which they collect meteorological data. Instead, the weather-related information to which drivers would be entitled would include areas outside those for which they collect meteorological data and may include areas for which meteorological data are collected by conventional means.

The disclosed weather collection system can be used to send weather-related information via the RDS/TMC (Radio Data System-Traffic Message Channel). The RDS-TMC system is described in various publications, including "Radio Data System, CENELEC END50067:1996, Specification of the Radio Data System." The RDS-TMC system broadcasts traffic messages to vehicles using an FM station data channel. RDS-TMC messages are broadcast regularly or at varying intervals depending on the priority of the event. The meteorological data obtained by a weather service from vehicles travelling along roads can be included in event notifications transmitted in RDS-TMC messages. For example, the weather service can include event notifications for high winds or icy conditions. Such information can be obtained in a timely manner using the disclosed in-vehicle meteorological data collection system. In one embodiment, some or all the vehicles that collect meteorological data include positioning system hardware and software that enable the meteorological data collection program in the vehicle to reference the locations at which meteorological data are collected to RDS/TMC location reference codes. Alternatively, the meteorological data collection service that collects the data from the vehicles may match the locations at which meteorological data are collected by vehicles (which may be in geographic coordinates or referenced to road segments) to RDS/TMC location reference codes.

In the embodiments described above, it was indicated that each of the vehicles that collects meteorological data includes a positioning systems, such as a GPS receiver, dead-reckoning equipment, etc., that can determine the instantaneous vehicle position. Alternatively, the location of any or all the vehicles that collect meteorological data can be determined remotely using technologies like those used for determining locations of cellular phones in an area. There are various available technologies that provide this feature. Some of the companies that provide this type of technology include ArrayComm, Inc., Harris Corporation, Corsair Communications, Lockheed Martin Corporation, CELLTRAX, Inc., TruePosition, Inc., Cell-Loc Inc. KSI Inc., and U.S. Wireless Corporation. Some of these technologies can be used to locate a cellular phone user who dials an emergency number, e.g., "911." Any such technology that is presently available or that becomes available in the future may be suitable.

The present invention provides a way to collect a significant amount of meteorological data without the expense of building new stationary weather data collection stations. The meteorological data are collected by sensor equipment installed in vehicles for other purposes, such as vehicle safety systems or navigation systems. Accordingly, no additional expense is associated with the provision of the sensor equipment in the vehicles.

It is intended that the foregoing detailed description be regarded as illustrative rather than limiting and that it is understood that the following claims including all equivalents are intended to define the scope of the invention.

I claim:

1. A method of collecting meteorological data comprising:
  receiving messages from each of a plurality of vehicles traveling along roads in a geographic region, wherein each message includes meteorological data pertaining to the geographic region; and
  using said meteorological data from said plurality of vehicles for weather forecasting, wherein said weather forecasting predicts a future state of meteorological conditions for the geographic region including off-road portions of the geographic region.

2. The method of claim 1 wherein each message also includes data indicating a time that said meteorological data was collected.

3. The method of claim 1 wherein said meteorological data comprises data indicating temperature.

4. The method of claim 1 wherein each of said messages includes data indicating a geographic position at which said meteorological data was collected.

5. The method of claim 1 wherein each of said messages includes data indicating an RDS/TMC location reference code indicating a geographic position at which said meteorological data was collected.

6. The method of claim 1 wherein said meteorological data comprises data indicating precipitation.

7. The method of claim 1 further comprising:
prior to the step of receiving, collecting meteorological data with each of said plurality of vehicles using sensor equipment installed in each of said plurality of vehicles.

8. The method of claim 7 further comprising:
prior to the step of receiving, transmitting said messages from each of said plurality of vehicles.

9. The method of claim 7 further comprising:
in at least some of said plurality of vehicles, using said meteorological data collected with said sensor equipment in a safety system installed in the vehicle.

10. The method of claim 7 further comprising:
in at least some of said plurality of vehicles, using said meteorological data collected with said sensor equipment in a navigation system in the vehicle.

11. The method of claim 1 further comprising:
transmitting RDS/TMC messages that include weather-related information derived from the meteorological data from each of said plurality of vehicles.

12. The method of claim 1 further comprising:
determining positions of the plurality of vehicles remotely using equipment that indicates locations from which the messages were sent.

13. A method of collecting meteorological data comprising:
gathering meteorological data with a plurality of vehicles that are traveling along roads in a geographic region;
transmitting data messages wireless from the plurality of vehicles that are traveling along roads in the geographic region, wherein each data message includes meteorological data; and
using said meteorological data from said plurality of vehicles for weather modeling, wherein said weather modeling simulates meteorological conditions for the geographic region including off-road portions of the geographic region.

14. The method of claim 13 wherein each of said data messages also includes data indicating a geographic position at which the meteorological data in said message was collected.

15. The method of claim 13 wherein each of said data messages also includes data indicating a time that said meteorological data included in said data message was collected.

16. The method of claim 13 wherein said meteorological data comprises data indicating temperature.

17. A meteorological data collection system comprising:
a plurality of vehicles each of which is equipped with sensor equipment that senses at least one meteorological condition and a wireless communication system that sends data representing the meteorological condition sensed by said sensor equipment; and
a meteorological data collection service that collects the data transmitted from each of said plurality of vehicles and uses said data for weather modeling that simulates meteorological conditions or forecasting that predicts a future state of meteorological conditions for the geographic region including off-road portions of the geographic region.

18. The invention of claim 17 wherein at least some of said plurality of vehicles includes a navigation system that receives data from the sensor equipment.

19. The invention of claim 17 wherein at least some of said plurality of vehicles includes at least one safety system that receives data from the sensor equipment.

20. The invention of claim 17 wherein said meteorological condition represented by said data is temperature.

21. The invention of claim 17 wherein said meteorological condition represented by said data is precipitation.

22. The invention of claim 17 wherein said meteorological condition represented by said data is barometric pressure.

23. The invention of claim 17 wherein each of said plurality of vehicles also sends data indicating a geographic location.

24. The invention of claim 17 wherein each of said plurality of vehicles also sends data indicating a time associated with said meteorological condition.

25. A business model for collection meteorological data comprising:
gathering meteorological data with a plurality of vehicles that are traveling along roads in a geographic region, wherein each of said plurality of vehicles is equipped with sensor equipment that senses at least one meteorological condition and a wireless communication system that sends data representing the meteorological conditions sensed by said sensor equipment;
using said meteorological data from said plurality of vehicles for simulating or predicting meteorological conditions for the geographic region including off-road portions of the geographic region; and
in exchange for receiving meteorological data from said plurality of vehicles, providing said vehicles with weather-related data.

26. The method of claim 13 wherein said weather modeling provides a map of isotherms.

27. A method of collecting meteorological data comprising:
receiving messages from each of a plurality of vehicles traveling along roads in a geographic region, wherein each message includes meteorological data pertaining to the geographic region; and
using said meteorological data from each of said plurality of vehicles for weather modeling or forecasting to provide meteorological conditions for the geographic region including off-road portions of the geographic region.

* * * * *